United States Patent [19]
Putzig

[11] 3,835,154
[45] Sept. 10, 1974

[54] BLUE DISPERSE 1,4-DIAMINOANTHRAQUINONE-2,3-DICARBOXIMIDE DYES

[75] Inventor: Donald Edward Putzig, Newark, Del.

[73] Assignee: E. I. du Pont de Nemours and Company, Wilmington, Del.

[22] Filed: July 25, 1972

[21] Appl. No.: 275,039

[52] U.S. Cl. .................... 260/326 C, 8/21 C, 8/39
[51] Int. Cl. ............................................. C07d 27/52
[58] Field of Search ............................. 260/326 C

[56] References Cited
FOREIGN PATENTS OR APPLICATIONS
41-3712  3/1966  Japan ............................. 260/326 C Primary Examiner—Joseph A. Narcavage

[57] ABSTRACT

Greenish-blue to blue disperse diaminoanthraquinonedicarboximide dyes having good application and fastness properties on water swellable cellulosic or synthetic fibers or blends or mixtures thereof, for example, cotton fabrics and polyester/cotton blend fabrics, said dyes having the formula

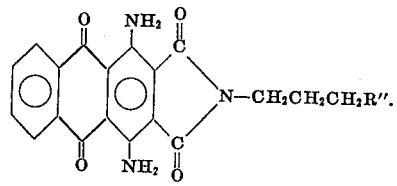

wherein R is Ophenyl, O(p-$C_{1-8}$ alkylphenyl), OCH(phenyl)$_2$, N($C_{1-8}$ alkyl)phenyl or N(phenyl)$_2$.

8 Claims, No Drawings

BLUE DISPERSE 1,4-DIAMINOANTHRAQUINONE-2,3-DICARBOXIMIDE DYES

BACKGROUND OF THE INVENTION

1. Field of the Invention

This invention relates to water insoluble blue diaminoanthraquinonedicarboximide dyes which have utility in the dyeing of a broad spectrum of synthetic and natural materials, especially water swellable cellulosic materials, or mixtures or blends of such synthetic and natural materials.

2. Description of the Prior Art

It is well known in the art that synthetic fibers, for example, fibers prepared from polyesters, polyamides or cellulose acetate, can be dyed with a wide variety of disperse dyes whose solubilities in water vary from very low to moderately high.

Natural fibers such as water swellable cellulosic fibers, especially cotton, are dyed by processes, and with dyes, which usually differ markedly from the processes and dyes employed with synthetic fibers. The conventional methods for dyeing water swellable cellulosic materials may be summarized as follows:

1. A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.
2. A water soluble preformed dye having an affinity for the cellulosic material is exhausted onto the material from an aqueous solution by a procedure which involves reducing the solubility of the dye in the aqueous solution, as with direct dyes.
3. A dye containing a substituent which reacts with the cellulose or a modified cellulose is exhausted onto the material from either an aqueous or nonaqueous solution under conditions such that the dye is chemically bonded to the substrate, as with fiber reactive dyes.
4. Water insoluble pigments are bonded to the cellulose with polymeric materials, as in pigment printing.
5. A finely divided form of a water insoluble dye is incorporated into the cellulose during a manufacturing step, as is sometimes done during spinning of viscose rayon.

None of these conventional procedures can be used to dye water swellable cellulose by directly introducing into the material a preformed nonreactive, water insoluble dye since such dyes have little natural affinity for or substantivity to such cellulosic materials.

Representative of the aforesaid processes wherein dyes are formed in situ after a precursor is deposited on or within the cellulose are processes disclosed in U.S. Pat. Nos. 396,692 and 2,069,215 and British Pat. No. 1,071,074. A process employing water soluble preformed dyes for dyeing cellulose is discussed in the Journal of the Society of Dyers and Colourists, 73, 23 (1957).

The aforesaid processes suffer from a variety of disadvantages, such as complexity of application, inability to achieve a broad spectrum of colors, and low fastness of the dyed cellulose to aqueous washing and/or drycleaning with organic solvents.

The use of dyes of low water solubility for dyeing cotton is disclosed in British Pat. No. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyes and dyeing processes for blends or mixtures of water swellable cellulosic and synthetic materials. Because of basic differences in the chemical and physical properties of the two types of materials, the components of the blend or mixture usually are dyed in complex two-stage processes employing two different types of dyes, each component being dyed independently of the other in a separate step. Cross-staining may result and the amounts of dyes required usually are high, with each component undesirably interfering with the dyeing of the other. When cross-staining occurs, the dye must be capable of being scoured off the stained component. Even under optimum conditions, balance, that is, equal shade and shade strength, between the components of the blend is difficult to achieve. If the dyed fabric lacks balance, under use conditions frosting (discolored areas) will occur in the regions of maximum wear. The complexities of the aforesaid two-stage process for dyeing blends also can be appreciated from a consideration of the divergency of operating conditions between conventional dyeing processes for cellulosic and for synthetic materials. In contrast to the prior art procedures for dyeing water swellable cellulose, the usual procedures for dyeing synthetic materials are based on dissolution of water insoluble dyes in the synthetic material.

Representative of prior art on the dyeing of blends of cellulosic and synthetic materials employing a two-stage process in U.S. Pat. No. 3,313,590. Analogous to the dyeing of such blends and confirming the aforesaid distinction between water swellable cellulosic materials and nonswellable cellulose acetate, U.S. Pat. No. 3,153,563 discloses a two-stage process wherein the cellulose acetate is dyed with a water insoluble dye without coloring the cellulose which then is dyed in an independent step.

In order to avoid the aforesaid problems relative to the dyeing of blends or mixtures of water swellable cellulosic and synthetic materials, prior art printing operations frequently are carried out using resin bonded pigments. Since such processes provide only surface coloration, the prints obtained often exhibit crocking, poor "hand" and low fastness to washing and drycleaning.

The swelling of cotton fibers and other similar cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331–337 (1962) report that cotton can be swollen with water containing both high boiling, water soluble, nonreactive compounds of limited molecular weight and a cross-linking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. No. 2,339,913 issued Jan. 25, 1944 to Hanford and Holmes. The cellulosic is swollen with water, the water then is replaced with methanol-benzene and finally with benzene, with retention of swelling. A cellulose-reactive material (cross-linking agent) is added as a benzene solution and cross-linking is effected.

Blackwell, Gumprecht and Starn in Canadian Pat. No. 832,343 disclose a process for dyeing water swellable cellulosic materials with disperse dyes, which process comprises contacting a water swellable cellulosic material in any sequence with the following:

1. water in an amount sufficient to swell the cellulose;

2. a dye in an amount sufficient to color the cellulose, a boiling saturated solution of which dye in 0.1 Molar aqueous sodium carbonate exhibits an optical absorbance not in excess of about 30; and 3. a solvent in an amount sufficient to maintain swelling of the cellulose if water is removed, and which a. is at least 2.5 weight % soluble in water at 25°C., b. boils above about 150°C. at atmospheric pressure, c. is a solvent for the dye at some temperature in the range of about 0° to 225°C., and d. has the formula

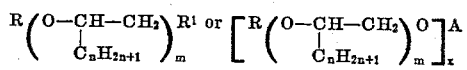

wherein $n$ is 0 or 1;

$m$ is a positive whole number;

$R$ is H, $C_{1-8}$ alkyl, $C_{7-15}$ aralkyl or alkaryl,

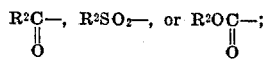

$R^1$ is —OH, —OR$^2$, —SR$^2$, —NHR$^2$, —NR$^2$(C$_{1-8}$ alkyl),

—NR$^2$(C$_{7-15}$ aralkyl or alkaryl),

—OCR$^2$, —OSO$_2$R$^2$, —OCOR$^2$, —NH(phenyl), or —NH(naphthyl);
  ‖                ‖
  O                O $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl;

$x$ is the number of unsatisfied valencies in A; and

A is ROCH$_2$CHORCH$_2$—, —CH$_2$CHORCH$_2$—,

—CH$_2$C(CH$_2$OR)$_3$, (—CH$_2$)$_2$C(CH$_2$OR)$_2$,
(—CH$_2$)$_3$CCH$_2$OR, (—CH$_2$)$_4$C, —CH$_2$(CHOR)$_y$CH$_2$OR,
—CH$_2$(CHOR)$_y$CH$_2$—, or

—CH$_2$(CHOR)$_{y-z}$(—CH)$_z$CH$_2$—in which $y$ is 2, 3, or 4, $z$ is 0, 1, 2, 3 or 4 but no greater than $y$, and R is as above-defined;

provided that at some stage during the process the interior of the swollen cellulose is contacted with a solution of the dye in aqueous solvent or solvent.

Particular embodiments of the aforesaid process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the process also include dyeing at elevated temperatures.

Still other embodiments of the aforesaid process include the dyeing of blends or mixtures of cellulosic and synthetic materials, such as polyamide or polyester, with the same dye. In such a process the cellulose is dyed as described above and the synthetic material is dyed either at the same time or in an independent step of the process.

OBJECTS AND SUMMARY OF THE INVENTION

It is an object of this invention to provide greenish-blue to blue disperse diaminoanthraquinonedicarboximide dyes which are useful in the above-described process of Blackwell et al. for dyeing water swellable cellulosic materials and blends or mixtures thereof with synthetic materials. It is a further object to provide dyes which exhibit good to excellent fastness to atmospheric oxidants, light, washing, drycleaning, crocking and sublimation when applied to water swellable cellulosic materials, synthetic materials or blends or mixtures of such cellulosic and synthetic materials.

In summary, the present invention resides in dyes of the formula given above in the abstract.

DETAILED DESCRIPTION OF THE INVENTION

The greenish-blue to blue dyes of the formula set forth above are prepared by heating an appropriately substituted propylamine and 1,4-diaminoanthraquinone-2,3-dicarboximide in an organic solvent system, such as 2-ethoxyethanol, nitrobenzene/isopropanol or o-dichlorobenzene/methanol mixtures, or an excess of the amine itself. When low boiling alcohols form part of the solvent system, the reaction is conveniently run in an autoclave in order to achieve the necessary and desired reaction temperature. The anthraquinone dicarboximide can be prepared from the corresponding 2,3-dicyano or 2,3-dicarboxamido compound according to well known prior art procedures. Propylamines, such as those given in Table 1, can be prepared in known manner by cyanoethylation of an aromatic phenol or amine with acrylonitrile followed by hydrogenation of the nitrile group.

TABLE 1

3-phenoxypropylamine     3-(N,N-diphenylamino)-propylamine

TABLE 1-Continued 3-(p-tolyloxy)propylamine 3-(p-t.-butylphenoxy)propylamine
3-(p-n-octylphenoxy)propylamine 3-(N-octylanilino)propylamine 3-(N-methylanilino)-propylamine
3-(N-butylanilino)-propylamine
3-(diphenylmethoxy)-propylamine Alternatively, the anthraquinone dicarboximide can be heated with an appropriately substituted propyl bromide in an organic solvent in the presence of a mild base such as an alkali metal carbonate. The bromo compounds can be prepared in known fashion by reacting a phenol or an aromatic amine in the presence of an equivalent amount of an acid acceptor, such as an alkali metal hydroxide, with an excess of 1,3-propylene dibromide, followed by removal of the excess propylene dibromide by distillation.

The dyes of this invention can be applied to water swellable cellulosic materials, or to mixtures or blends thereof with synthetic materials, such as polyesters or polyamides, by the aforesaid Blackwell et al. process. The cellulosic materials which can be dyed thus with the dyes of this invention include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Also included is cotton which has been treated in any way which does not significantly reduce its swelling upon heating with water; raw or scoured cotton and cotton which has been mercerized or otherwise preshrunk are dyeable with the dyes of this invention. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. Dyeing of viscose rayon fabric is promoted by pretreatment with 10% aqueous caustic or by the presence of wetting agents, preferably of the non-ionic type, which assist penetration of the fibers by the dye solvent. Mixtures of cotton and rayon fibers can be dyed and the present dyes also can be used to dye purified wood pulp and paper. Excluded herein as the water swellable cellulosic material is cellulose acetate which does not exhibit the requisite swellability in the presence of water.

The dyes of this invention are particularly useful for dyeing blends of cotton and polyester, such as those containing 50–80% polyethylene terephthalate and 20–50% cotton. Since the dyes of this invention can be used to dye both components in a blend, scourability as a factor in dye selection is avoided because of minimization of the problem of cross-staining that is generally encountered when polyester/cellulosic blend fabrics are dyed conventionally with two classes of dyes, such as disperse/vat or disperse/direct dye combinations.

The dyes of this invention dye the substrate directly, that is, they do not require oxidation, reduction, hydrolysis, or any other chemical modification for development of color or fastness. The dyes give greenish-blue shades on polyester and blue shades on cotton. This markedly similar shading on the two types of textile materials is unusual for a dye of this structure. For example, homologous prior art dyes having as the imido nitrogen substituent the $-CH_2CH_2OC_6H_5$ or $-CH_2CH_2OC_6H_4CH_3$ moiety (instead of the aryloxypropyl moiety of the dyes of this invention) produce a greenish-blue shade on polyester but a dull reddish-blue shade on cotton. As a result, the dyes of this invention are more attractive for self-shade dyeings and are more versatile for use in mixed shades with other similar types of disperse dyes on blend fabrics. They exhibit good to excellent fastness to light, nitrogen oxides, ozone, washing, crocking, sublimation, and drycleaning on synthetic and cellulosic fibers. They are readily milled to give uniform aqueous dispersions.

In dyeing cellulosic materials with the dyes of this invention using the Blackwell et al. process, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye padbath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissoltuion without further evaporation of water. Dye pastes can be prepared by conventional techniques, such as by milling the dye in the presence of a dispersing agent or surfactant. A dyebath can be prepared by diluting the dye paste with water or with aqueous solvent. Addition of a solvent to the dye paste before addition of water may cause dye separation and usually is avoided. It will be understood by those skilled in the art that additives other than a dye solvent and a dispersing agent can be present in dyebaths. Such additives frequently include migration inhibitors, such as purified vegetable gums, and wetting agents, examples of which are ionic and nonionic surfactants, such as ethylene oxide condensation products, hydrocarbon sulfonates and long-chain alcohol sulfates. Dyebaths used in practicing this invention also can contain dyes other than those of this invention; for example, direct dyes or fiber reactive dyes for cotton or for polyamides can be present for shading purposes.

In the preferred dyeing procedure with the dyes of this invention, an aqueous dye dispersion and the organic solvent are applied to the fabric from a single padbath. The amount of water in the padbath usually is 70–95 weight percent and the solvent, 5–30 weight percent. The padded fabric is heated at 180°–225°C. for 30–180 seconds. For cotton, temperatures as low as 150°C. usually are adequate. The dyed fabric generally is given an aqueous scour, or an aqueous scour followed by a perchloroethylene scour, to ensure complete removal of surface dye.

The following experiment shows the utility of the dyes of this invention.

Dyeing 65/35 "Dacron" Polyester/Cotton Blend Fabric

A. A padbath was prepared from:

| | |
|---|---|
| an aqueous dye paste (15% active ingredient) containing the dye of Example 3 | 50 grams |
| purified vegetable gum thickener | 20 grams |
| methoxypolyethylene glycol (molecular weight 550) | 100 grams |
| Diethylene glycol mono-n-butyl ether | 33 grams |
| boric acid | 6.5 grams |
| water | to 1 liter. |

A continuous length of 65/35 Dacron polyester/cotton fabric was padded at 60% uptake, based on the weight of the fiber, and the padded fabric was passed at a rate of 2 yards per minute between two 1,000 watt infrared lamps (Fostoria-Fannon, Inc., Infrared Heater Model 6624), with each lamp shining on opposite surfaces of the fabric from a distance of about 3 inches. The continuously moving fabric was passed through a circulating air oven at 80°–100°C., with a hold-up time of 1 minute, and then through an oven at 200°–210°C. with a hold-up time of 1.7 minutes. The hot dry fabric was cooled to room temperature and rinsed for one minute each in sequence: in water at 20°–30°C., in water at 90°–95°C., at 90°–95°C. in water containing 1% of an ether-alcohol sulfate detergent, in water at 90°–95°C., and in water at 20°–30°C. The material was dried and then scoured for 5 minutes in perchloroethylene at 50°C. Uniformly bright greenish-blue shades were produced having excellent fastness to light, crocking, sublimation, drycleaning and washing.

Printing of 65/35 Dacron Polyester/Cotton Blend Fabric

B. A 65/35 Dacron polyester/cotton blend fabric was padded to about 70% pickup with an aqueous solution containing 120 grams per liter of polyethylene glycol (M.W. 600). The padded fabric was heated at 160°C. for 5 minutes to evaporate water. The fabric was then printed in a pattern with a print paste prepared from:

| | |
|---|---|
| an aqueous paste (15% active ingredient) containing the dye of Example 1 | 10 grams |
| purified natural gum ether thickener | 60 grams |
| water | 30 grams. |

The printed fabric was heated at 200°C. for 100 seconds, scoured in water containing an ether-alcohol sulfate detergent at about 90°C. for 5 minutes, dried, scoured in tetrachloroethylene at about 50°C. for 5 minutes and dried. The printed areas were strongly dyed in a greenish-blue shade.

The dyes of this invention can be applied to polyester fabric from an aqeuous dye bath under pressure or by a pad-heat procedure, for example, by means of a Thermosol process.

The following examples are given to illustrate the invention. All parts are given by weight.

Example 1

A mixture of 30.7 parts of 1,4-diaminoanthraquinone-2,3-dicarboximide, 43 parts of 3-(N,N-diphenylamino)propylamine, 60 parts of dimethylformamide and 55 parts of 2-ethoxyethanol was stirred for 16 hours at 145°C. and cooled to 80°C. The solids were isolated by filtration, washed in turn with 2-ethoxyethanol, isopropanol and hot water and then dried. After recrystallization from dimethylformamide, the blue dye melted at 242°–246°C. and had an $a_{max}$ of 30.0 liters/gram/cm. (l.g.$^{-1}$cm.$^{-1}$) at a $\lambda_{max}$ of 675 $\mu$. Calc'd. for $C_{31}H_{24}N_4O_4$: C, 72.1; H, 4.65; N, 10.85%. Found: C, 72.1; H, 4.9; N, 10.9%. The dye was of the formula given above wherein R is $-N(C_6H_5)_2$. This dye exhibits excellent fastness to washing, crocking, sublimation and drycleaning and good fastness to light, nitrogen oxides and ozone on 65/35 Dacron polyester/cotton blend fabric.

Example 2

The procedure of Example 1 was repeated except that 3-(N,N-diphenylamino)propylamine was replaced with an equivalent amount of 3-(N-ethylanilino)propylamine. The resulting blue dye was recrystallized once from dimethylformamide and once from a dimethylformamide/2-ethoxyethanol system. The solids melted at 189°–193°C. and had an $a_{max}$ of 675 $\mu$. The dye was of the formula given above wherein R is

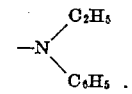

It exhibits excellent fastness to crocking, sublimation and drycleaning and good fastness to light, washing, nitrogen oxides and ozone on polyester/cotton blend fabric.

Example 3

A mixture of 15 parts of 1,4-diaminoanthraquinone, 6.9 parts of potassium carbonate and 75 parts of dimethylformamide was heated to 100°C. and stirred for 2 hours, after which 14.5 parts of p-t.-amylphenoxypropyl bromide were added over a 10 minute period. The reaction mixture was stirred at 100°C. for 6 hours. The reaction mixture was cooled to room temperature and the solids were isolated by filtration and slurried in 1,000 parts of 1% caustic soda. After stirring for 3 hours the solids were again isolated by filtration, washed until alkali free and dried. Finally, they were recrystallized from dimethylformamide. The chromatographically pure blue dye had an $a_{max}$ of 30.8 l.g.$^{-1}$cm.$^{-1}$ at a $\lambda_{max}$ of 675 $\mu$. The dye was of the formula given above wherein R is

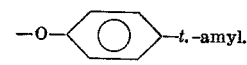

It exhibits excellent fastness to light, washing, crocking, sublimation and drycleaning on polyester/cotton blend fabric.

Example 4

A mixture of 10 parts of 1,4-diaminoanthraquinone-2,3-dicarboximide, 4.6 parts of potassium carbonate and 100 parts of dimethylformamide was stirred at 100°C. for 2 hours, after which were added 8.8 parts of p-t.-butylphenoxypropyl bromide. The reaction mixture was stirred at 100°C. for 3 hours, then allowed to cool to room temperature. The mass was then cooled in an ice bath and the solids were isolated by filtration, washed with dimethylformamide and then with water and dried. The chromatographically pure blue dye had an $a_{max}$ of 30.8 $l.g.^{-1}$ $cm.^{-1}$ at a $\lambda_{max}$ of 675 $\mu$. The dye was of the formula given above wherein R is

It exhibits similar fastness properties on polyester/cotton blend material to the dye of Example 3 except that its washfastness is not quite as good.

Example 5

A mixture of 15.3 parts of 1,4-diaminoanthraquinone-2,3-dicarboximide, 50 parts of dimethylformamide, 40 parts of 2-ethoxyethanol and 37.3 parts of p-t.-octylphenoxypropylamine was stirred at the reflux temperature for 24 hours, then cooled to 80°C. The solids were isolated by filtration, washed in turn with 2-ethoxyethanol, isopropanol and water and then dried and recrystallized from dimethylformamide. A yield of 12.3 parts of chromatographically pure blue dye was obtained, having an $a_{max}$ of 27.5 $l.g.^{-1}cm.^{-1}$ at a $\lambda_{max}$ of 675 $\mu$. The dye was of the formula given above wherein R is

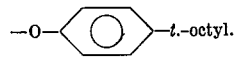

Example 6

Repetition of the procedure of Example 5 using 21.4 parts of phenoxypropylamine in place of the p-t-octylphenoxypropylamine produced a chromatographically pure blue dye having an $a_{max}$ of 32.9 $l.g.^{-1}cm.^{-1}$ at a $\lambda_{max}$ of 675 $\mu$. The dye was of the formula given above wherein R is

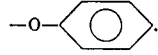

It has similar fastness properties on polyester/cotton blend fabric to the dye of Example 3 except that its washfastness is not quite as good.

Example 7

A mixture of 23 parts of 1,4-diaminoanthraquinone-2,3-dicarboximide, 34.4 parts of diphenylmethoxypropylamine, 60 parts of dimethylformamide and 55 parts of 2-ethoxyethanol was stirred at the reflux temperature for 19 hours. The product was isolated, washed and recrystallized by the procedure described in Example 5. The resulting chromatographically pure blue dye melted at 220°–223°C. and had an $a_{max}$ of 29.6 $l.g.^{-1}cm.^{-1}$ at a $\lambda_{max}$ of 675 $\mu$. The dye was of the formula given above wherein R is $-OCH(C_6H_5)_2$. It has excellent fastness to light, crocking, sublimation, drycleaning, nitrogen oxides and ozone and fair washfastness on polyester/cotton blend fabric.

The embodiments of the invention in which an exclusive property or privilege is claimed are defined as follows:

1. The dye of the formula

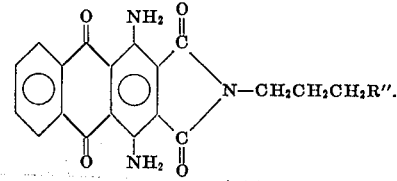

wherein R is Ophenyl, O(p-$C_{1-8}$ alkylphenyl), OCH(phenyl)$_2$, N($C_{1-8}$ alkyl)phenyl or N(phenyl)$_2$.

2. The dye of claim 1 wherein R is $-N(C_6H_5)_2$.

3. The dye of claim 1 wherein R is

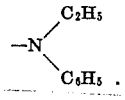

4. The dye of claim 1 wherein R is

5. The dye of claim 1 wherein R is

6. The dye of claim 1 wherein R is

7. The dye of claim 1 wherein R is

8. The dye of claim 1 wherein R is $-OCH(C_6H_5)_2$.

* * * * *